(12) United States Patent
Hu et al.

(10) Patent No.: US 11,070,395 B2
(45) Date of Patent: Jul. 20, 2021

(54) CUSTOMER PREMISES LAN EXPANSION

(71) Applicant: Alcatel-Lucent USA Inc., Murray Hill, NJ (US)

(72) Inventors: Jun Hu, San Jose, CA (US); Sanjay Wadhwa, Cupertino, CA (US)

(73) Assignee: Nokia of America Corporation, Murray Hill, NJ (US)

(*) Notice: Subject to any disclaimer, the term of this patent is extended or adjusted under 35 U.S.C. 154(b) by 89 days.

(21) Appl. No.: 14/964,260

(22) Filed: Dec. 9, 2015

(65) Prior Publication Data

US 2017/0171074 A1   Jun. 15, 2017

(51) Int. Cl.
*H04L 12/46* (2006.01)

(52) U.S. Cl.
CPC ...... *H04L 12/4633* (2013.01); *H04L 12/4641* (2013.01)

(58) Field of Classification Search
CPC . H04L 12/4633; H04L 12/4641; H04L 45/50; H04L 45/66; H04L 45/745
See application file for complete search history.

(56) References Cited

U.S. PATENT DOCUMENTS

| | | | |
|---|---|---|---|
| 6,920,503 B1* | 7/2005 | Nanji | H04L 63/08 370/351 |
| 7,890,605 B1* | 2/2011 | Protassov | G06F 9/5055 709/201 |
| 8,396,946 B1* | 3/2013 | Brandwine | H04L 12/6418 709/220 |
| 8,724,629 B1 | 5/2014 | Goli et al. | |

(Continued)

FOREIGN PATENT DOCUMENTS

| | | |
|---|---|---|
| CN | 102577256 A | 7/2012 |
| JP | 2014187534 A | 10/2014 |
| JP | 2015512588 A | 4/2015 |

OTHER PUBLICATIONS

RFC 4364—BGP/MPLS IP Virtual Private Networks (VPNs)—(Feb. 2006).*

(Continued)

*Primary Examiner* — Dung B Huynh
(74) *Attorney, Agent, or Firm* — Tong, Rea, Bentley & Kim, LLC

(57) ABSTRACT

The present disclosure discloses mechanisms for extending a local area network of a customer premises of a customer outside of the customer premises and into a private data network. The extension of a local area network of a customer premises outside of the customer premises and into a private data network may be provided using a customer bridge associated with the customer local area network, a customer bridging domain hosted on a network gateway device for the customer, and a switching element hosted in the private data network for the customer. The network gateway device may be configured to receive, at the customer bridging domain of the customer via a first tunnel associated with the customer bridging domain, a packet including a destination address and determine, based on the destination address, whether to forward the packet via a second tunnel associated with the customer bridging domain or whether to forward the packet toward a public data network.

22 Claims, 4 Drawing Sheets

(56) References Cited

U.S. PATENT DOCUMENTS

| | | | | |
|---|---|---|---|---|
| 8,880,727 B1* | 11/2014 | Kodeboyina | ........... | H04L 45/66 709/238 |
| 8,924,542 B1* | 12/2014 | Gabrielson | ......... | H04L 12/4641 709/224 |
| 9,178,816 B1* | 11/2015 | Ojha | ...................... | H04L 45/02 |
| 9,774,495 B1* | 9/2017 | Okita | ................ | H04L 41/0803 |
| 2003/0110288 A1 | 6/2003 | Ramanujan | ......... | H04L 63/0272 709/238 |
| 2003/0112809 A1* | 6/2003 | Bharali | .................. | H04L 45/02 370/400 |
| 2004/0208153 A1* | 10/2004 | Mizell | .................... | H04L 45/306 370/338 |
| 2005/0018605 A1* | 1/2005 | Foote | .................. | H04L 12/4641 370/230 |
| 2005/0053079 A1* | 3/2005 | Havala | .................... | H04J 3/1611 370/400 |
| 2005/0074015 A1* | 4/2005 | Chari | .................. | H04L 29/12018 370/400 |
| 2005/0237982 A1* | 10/2005 | Pankajakshan | ..... | H04L 12/5692 370/338 |
| 2005/0254487 A1* | 11/2005 | Boll | .................... | H04L 12/2883 370/389 |
| 2005/0265309 A1* | 12/2005 | Parandekar | ......... | H04L 12/2801 370/351 |
| 2006/0120374 A1* | 6/2006 | Yoshimoto | .......... | H04L 12/2856 370/392 |
| 2006/0136233 A1* | 6/2006 | Takeda | ................ | H04L 12/4641 709/227 |
| 2006/0251067 A1* | 11/2006 | DeSanti | ............. | H04L 61/6004 370/389 |
| 2007/0019676 A1* | 1/2007 | Kompella | ............... | H04L 45/10 370/468 |
| 2007/0266432 A1* | 11/2007 | Hara | .................. | H04L 12/4633 726/15 |
| 2007/0288255 A1* | 12/2007 | Cai | ........................ | G06Q 10/06 711/170 |
| 2008/0037557 A1* | 2/2008 | Fujita | .................. | H04L 12/4633 370/395.53 |
| 2008/0056251 A1* | 3/2008 | Zheng | .................... | H04W 8/085 370/389 |
| 2008/0069024 A1* | 3/2008 | Iino | ....................... | H04W 48/12 370/313 |
| 2008/0212579 A1* | 9/2008 | LaVigne | ................. | H04L 12/66 370/389 |
| 2008/0240122 A1* | 10/2008 | Richardson | ............. | H04L 12/66 370/401 |
| 2008/0270606 A1* | 10/2008 | Gooch | ................ | H04L 12/4641 709/225 |
| 2008/0304456 A1* | 12/2008 | Iino | .................... | H04L 12/4633 370/338 |
| 2009/0016365 A1* | 1/2009 | Sajassi | .................... | H04L 45/04 370/401 |
| 2009/0168783 A1* | 7/2009 | Mohan | ................ | H04L 12/4633 370/395.5 |
| 2009/0268609 A1* | 10/2009 | Koch | .................... | H04L 12/423 370/222 |
| 2009/0290537 A1* | 11/2009 | Berglund | ............ | H04L 12/4633 370/328 |
| 2010/0046524 A1* | 2/2010 | Rune | .................. | H04L 12/4641 370/395.53 |
| 2010/0157963 A1* | 6/2010 | Choi | ........................ | H04L 12/66 370/338 |
| 2010/0322255 A1* | 12/2010 | Hao | ........................ | H04L 45/00 370/398 |
| 2010/0332615 A1* | 12/2010 | Short | ....................... | H04L 63/08 709/217 |
| 2011/0019654 A1* | 1/2011 | Harmatos | ............. | H04W 92/02 370/338 |
| 2011/0022711 A1* | 1/2011 | Cohn | .................... | H04L 41/04 709/225 |
| 2011/0090911 A1* | 4/2011 | Hao | ................... | H04L 12/4633 370/395.53 |
| 2011/0182227 A1* | 7/2011 | Rune | .................... | H04W 8/082 370/312 |
| 2011/0200042 A1* | 8/2011 | Goli | ..................... | H04L 12/4641 370/390 |
| 2011/0317703 A1* | 12/2011 | Dunbar | ................. | H04L 12/462 370/392 |
| 2012/0281707 A1* | 11/2012 | Muhanna | ............ | H04L 61/2575 370/401 |
| 2012/0327938 A1* | 12/2012 | Song | ................... | H04L 12/4633 370/392 |
| 2013/0046883 A1* | 2/2013 | Lientz | ................. | H04L 41/0816 709/224 |
| 2013/0054763 A1* | 2/2013 | Van der Merwe | .......................... | H04L 63/0272 709/220 |
| 2013/0212422 A1 | 8/2013 | Bauer et al. | | |
| 2013/0227670 A1* | 8/2013 | Ahmad | ............... | H04L 41/5054 726/11 |
| 2013/0250947 A1* | 9/2013 | Zheng | ..................... | H04L 45/02 370/389 |
| 2013/0305344 A1* | 11/2013 | Alicherry | ............ | H04L 63/0272 726/12 |
| 2013/0308646 A1* | 11/2013 | Sajassi | .................... | H04L 45/04 370/395.53 |
| 2013/0318246 A1 | 11/2013 | Kuriakose et al. | | |
| 2013/0326053 A1 | 12/2013 | Bauer et al. | | |
| 2013/0332573 A1 | 12/2013 | Hegland et al. | | |
| 2013/0332577 A1 | 12/2013 | Nakil et al. | | |
| 2013/0332602 A1 | 12/2013 | Nakil et al. | | |
| 2014/0003357 A1* | 1/2014 | Ejzak | ..................... | H04W 76/12 370/329 |
| 2014/0086580 A1* | 3/2014 | Griswold | ............ | H04L 12/2872 398/45 |
| 2014/0164618 A1 | 6/2014 | Alicherry et al. | | |
| 2014/0181268 A1* | 6/2014 | Stevens | ............... | H04L 67/2804 709/219 |
| 2014/0280821 A1 | 9/2014 | Maitland et al. | | |
| 2015/0030032 A1* | 1/2015 | Sinn | ........................ | H04L 45/42 370/395.53 |
| 2015/0081869 A1* | 3/2015 | Wang | ..................... | H04L 41/046 709/223 |
| 2015/0146727 A1* | 5/2015 | Ye | ......................... | H04L 45/745 370/392 |
| 2015/0146734 A1* | 5/2015 | Haney | ................. | H04L 12/4633 370/392 |
| 2015/0169353 A1 | 6/2015 | Colla et al. | | |
| 2015/0334057 A1* | 11/2015 | Gao | ....................... | H04L 49/351 370/392 |
| 2016/0087885 A1* | 3/2016 | Tripathi | ................ | H04W 76/12 370/389 |
| 2016/0149724 A1* | 5/2016 | Wang | ..................... | H04L 12/46 370/392 |
| 2016/0198003 A1* | 7/2016 | Luft | ....................... | H04L 12/46 709/225 |
| 2016/0274926 A1* | 9/2016 | Narasimhamurthy | ....................... | G06F 9/45558 |
| 2017/0005907 A1* | 1/2017 | Onno | ................... | H04L 12/66 |
| 2017/0054628 A1* | 2/2017 | Tomotaki | ................ | H04L 45/06 |
| 2017/0085502 A1* | 3/2017 | Biruduraju | .......... | H04L 12/4633 |
| 2018/0123827 A1* | 5/2018 | Josyula | ............... | H04L 12/4641 |
| 2018/0159759 A1* | 6/2018 | Liang | ..................... | H04L 45/02 |

OTHER PUBLICATIONS

Cisco, "Data Center Interconnect: Layer 2 Extension Between Remote Data Centers", White Paper, Cisco Public Information, pp. 1-30, Jul. 2011.

International Search Report and Written Opinion of corresponding PCT/US2016/065201, dated Feb. 6, 2017, 10 pages.

International Search Report and Written Opinion dated Jun. 5, 2017 in corresponding PCT Application No. PCT/US2016/065201, 9 pages.

Chinese Office Action mailed in corresponding CN Application No. 201680071593.8 dated May 26, 2020, 11 pages.

Japanese Office Action mailed in corresponding JP Application No. 2018-530143 dated May 14, 2019, 4 pages.

(56) References Cited

OTHER PUBLICATIONS

Office Action mailed in corresponding CN201680071593.8 dated Feb. 10, 2021, 8 pages.

* cited by examiner

CUSTOMER PREMISES LAN EXPANSION

TECHNICAL FIELD

The disclosure relates generally to the field of communications and, more particularly but not exclusively, to supporting the communications of a customer premises network.

BACKGROUND

A customer of a communications service provider may utilize various types of customer devices, typically referred to as customer premises equipment (CPE), at the customer premises of the customer. For example, the CPEs at a customer premises may include devices such as telephones, set-top boxes, smart televisions, routers, switches, residential gateways (RGs), or the like. The CPEs at the customer premises may be networked together to form a local area network (LAN) at the customer premises. The CPEs at the customer premises may communicate with each other or with other device located outside of the customer premises.

SUMMARY

The present disclosure generally discloses mechanisms for extending a local area network of a customer premises of a customer outside of the customer premises and into a private data network.

In at least some embodiments, an apparatus includes a processor and a memory communicatively connected to the processor. The processor is configured to receive, at a customer bridging domain of a customer via a first tunnel between the customer bridging domain and a customer bridge of a customer premises of the customer, a packet including a destination address. The processor is configured to determine, based on the destination address of the packet, whether to forward the packet toward a private data network via a second tunnel between the customer bridging domain and a switching element hosted for the customer within the private data network or whether to forward the packet toward a public data network.

In at least some embodiments, an apparatus includes a processor and a memory communicatively connected to the processor. The processor is configured to receive, at a customer bridging domain of a customer via a first tunnel between the customer bridging domain and a switching element hosted for the customer within the private data network, a packet including a destination address. The processor is configured to determine, based on the destination address of the packet, whether to forward the packet toward a customer bridge of a customer premises of the customer via a second tunnel between the customer bridging domain and the customer bridge or whether to forward the packet toward a public data network.

In at least some embodiments, an apparatus includes a processor and a memory communicatively connected to the processor. The processor is configured to receive, at a customer bridging domain of a customer via a first tunnel associated with the customer bridging domain, a packet including a destination address. The processor is configured to determine, based on the destination address of the packet, whether to forward the packet via a second tunnel associated with the customer bridging domain or whether to forward the packet toward a public data network.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses mechanisms adapted for extending a local area network of a customer premises of a customer outside of the customer premises and into a private data network. The extension of a local area network of a customer premises of a customer outside of the customer premises and into a private data network may be provided using a customer bridge associated with the customer local area network, a customer bridging domain hosted on a network gateway device for the customer, and a switching element hosted in the private data network for the customer. The network gateway device may be configured to (1) receive, at the customer bridging domain of the customer via a first tunnel associated with the customer bridging domain, a packet including a destination address and (2) determine, based on the destination address of the packet, whether to forward the packet via a second tunnel associated with the customer bridging domain or whether to forward the packet toward a public data network. For example, for an upstream packet received from the customer premises, the first tunnel may be a tunnel between the customer bridge associated with the customer local area network and the customer bridging domain hosted on the network gateway device for the customer and the second tunnel may be a tunnel between the customer bridging domain hosted on the network gateway device for the customer and a switching element hosted in the private data network for the customer. For example, for a downstream packet received from a customer component hosted within the private data network for the customer, the first tunnel may be a tunnel between a switching element hosted in the private data network for the customer and the customer bridging domain hosted on the network gateway device for the customer and the second tunnel may be a tunnel between the customer bridging domain hosted on the network gateway device for the customer and the customer bridge associated with the customer local area network. These and various other embodiments of mechanisms adapted for extending the local area network of the customer premises of a customer outside of the customer premises and into a private data network may be further understood by way of reference to FIG. 1.

Figure 1:
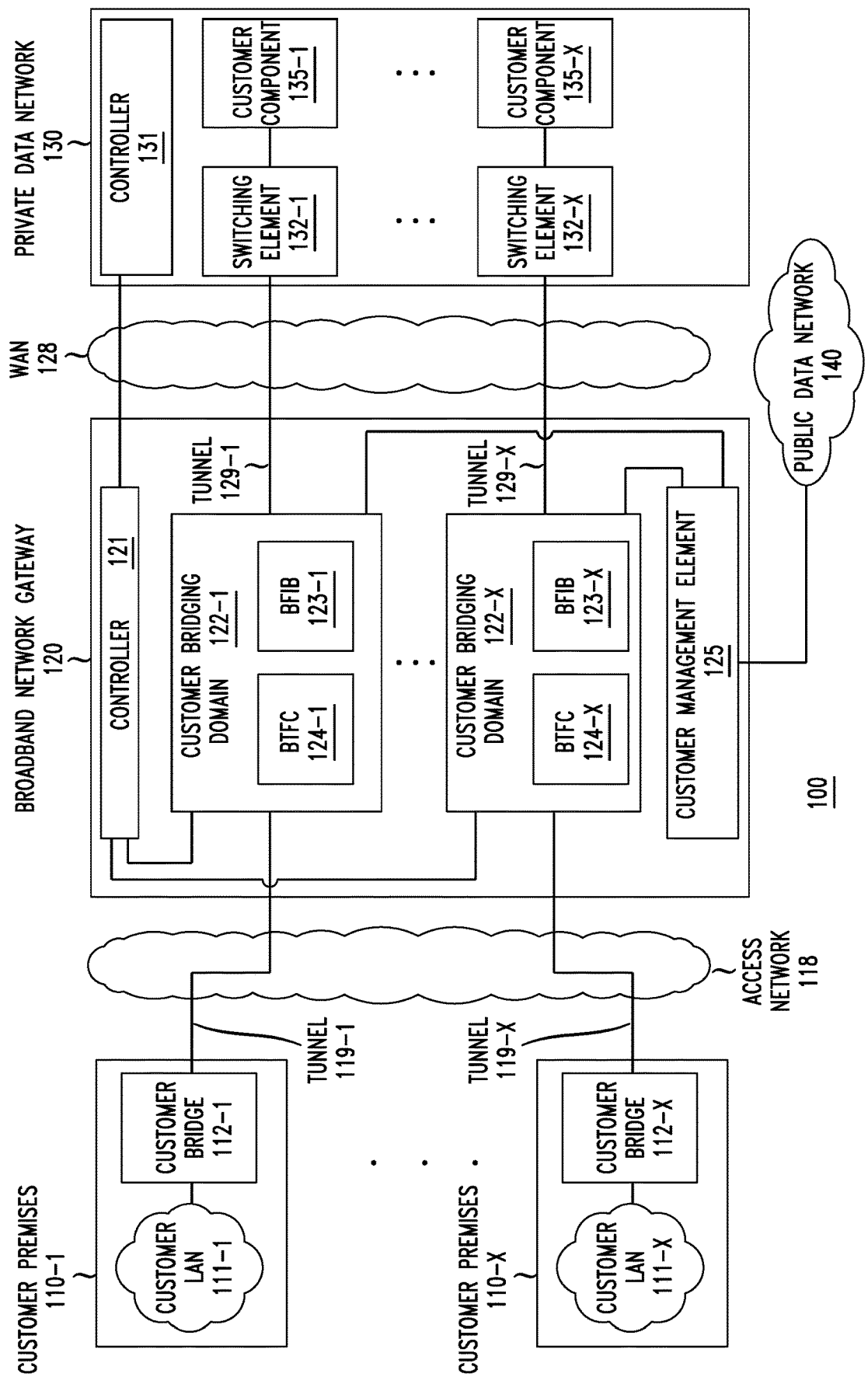
FIG. 1 depicts a high-level block diagram of a system supporting extension of local area networks of customer premises to a private data network.

FIG. 1 depicts a high-level block diagram of a system supporting extension of local area networks of customer premises to a private data network.

The system 100 includes devices deployed at a plurality of customer premises 110-1-110-X (collectively, customer premises 110), a broadband network gateway (BNG) 120, a private data network 130, and a public data network 140.

The customer premises 110 may be any suitable customer locations at which customer equipment of customers may be deployed. For example, customer premises 110 may include homes, small businesses, enterprise business locations, or the like. It will be appreciated that the customers may be customers of one or more operators or providers. For example, network access from the customer premises 110 may be provided by network access providers or operators while the private data network may be provided by a private data network provider or operator (e.g., a datacenter operator where private data network 130 is a datacenter).

The customer premises 110-1-110-X include a plurality of customer local area networks (LANs) 111-1-111-X (collectively, customer LANs 111), respectively. The customer LAN 111 of a customer premises 110 may include one or more customer devices (omitted from FIG. 1 for purposes of clarity), which may be networked together to form the customer LAN 111. For example, customer devices which may be part of a customer LAN may include customer premises equipment (CPE) such as a desktop computer, a laptop computer, a printer, a smartphone, a set-top box, a smart television, a server, a switch, a router, or the like, as well as various combinations thereof. The customer LAN 111 of a customer premises 110 may utilize Ethernet, WiFi, or any other protocol(s) suitable for supporting the customer LAN 111.

The customer premises 110-1-110-X include a plurality of customer bridges 112-1-112-X (collectively, customer bridges 112), respectively. The customer bridge 112 of a customer premises 110 may be configured to function as a point of access of the customer premises 110, operating as a gateway between the customer LAN 111 of the customer premises 110 and locations and devices located outside of the customer premises 110. The customer bridges 112 may be configured to provide network bridging functions for the customer premises 110, respectively. The customer bridges 112 may be configured to provide network bridging functions for the customer premises 110, respectively, at Layer 2 of the Open Standards Interconnection (OSI) model. The customer bridges 112 may be used in place of customer routers typically used as the point of access of customer premises (which operate at Layer 3 of the OSI model). It is noted that the customer bridges 112 also may be referred to herein as bridge customer premises equipment (BCPE).

The customer bridges 112-1-112-X support a plurality of tunnels 119-1-119-X (collectively, tunnels 119) to respective customer bridging domains (discussed further below) that are hosted within the BNG 120 for the customer premises 110-1-110-X, respectively. The tunnels 119 may include virtual local area network (VLAN) tunnels, Internet Protocol (IP) tunnels (e.g., Generic Routing Encapsulation (GRE) tunnels or other suitable types of IP-based tunnels), or the like. The tunnels 119 may support transport of Ethernet traffic (e.g., native Ethernet traffic via VLAN tunnels, IP tunnels in which the payload includes Ethernet frames, or the like) or other suitable types of Layer 2 traffic which may be supported by the customer LANs 111. The communication between the customer premises 110-1-110-X and the BNG 120 may be supported by an access network (AN) 118, in which case the tunnels 119-1-119-X may be established over the AN 118. The AN 118 may be any suitable type of AN, which may utilize various communications technologies. For example, the AN 118 may utilize various types of underlying access technologies, such as fixed broadband access typically available to customer premises (e.g., cable access networks, Digital Subscriber Line (DSL) access networks, optical access networks, or the like), wireless broadband access, or the like, as well as various combinations thereof.

The customer bridges 112-1-112-X support various customer traffic bridging functions for customer LANs 111-1-111-X, respectively. For upstream traffic originating from customer devices of a customer premises 110, the customer bridge 112 associated with the customer premises 110 may be configured to determine whether to bridge the traffic within the customer premises 110 (e.g., to direct a packet received via a first customer device of the customer premises 110 to a second customer device of the customer premises 110 via the associated customer LAN 111) or to provide the traffic to tunnel 119 associated with customer bridge 112 for propagation outside of the customer premises 110 toward BNG 120. For downstream traffic received by a customer bridge 112 of a customer premises 110, the customer bridge 112 may be configured to forward the traffic toward the customer device(s) of the customer premises 110 for which the traffic is intended (e.g., via the associated customer LAN 111). As discussed further below, forwarding of traffic by the customer bridges 112 of the customer LANs 111 may be based on the destination addresses (e.g., destination MAC addresses or other suitable types of addresses).

The BNG 120 is configured to provide various broadband network gateway functions for the customer premises 110. The BNG 120 includes a controller 121, a plurality of customer bridging domains 122-1-122-X (collectively, customer bridging domains 122), and a customer management element 125.

The controller 121 is configured to provide various control functions for BNG 120. The controller 121 may be configured to interface with a controller of the private data network 130 (e.g., to support exchanging of information which is used to support communications by the customer devices of the customer LANs 111 and by the customer components of the private data network 130 that are associated with the customer LANs 111, as discussed further below).

The customer bridging domains 122-1-122-X provide bridging domains for the customer premises 110-1-110-X, respectively. The customer bridging domains 122-1-122-X may be configured to operate as virtual bridging elements for customer premises 110-1-110-X, respectively. For example, the customer bridging domains 122 may be implemented as Layer 2 virtual devices (e.g., virtual Ethernet bridges). For example, the customer bridging domains 122 may be implemented as Layer 2 virtual private network services (VPNSs). For example, the customer bridging domains 122 may be implemented using other suitable Layer 2 virtual devices or services.

The customer bridging domains 122-1-122-X support a plurality of tunnels 129-1-129-X (collectively, tunnels 129) to respective switching elements (discussed further below) that are hosted within the private data network 130 for the customer premises 110-1-110-X, respectively. The tunnels 129-1-129-X enable the customer bridging domains 122-1-122-X (and, thus, the associated customer LANs 111-1-111-X) to be extended into the private data network 130. The tunnels 129 may include virtual extensible local area network (VXLAN) tunnels, Multi-Protocol Label Switching (MPLS) tunnels, or the like. The tunnels 129 may support transport of Ethernet traffic or other suitable types of Layer 2 traffic which may be supported by the customer LANs 111.

The communication between BNG 120 and private data network 130 may be supported by a wide area network (WAN) 128, in which case the tunnels 129-1-129-X may be established over the WAN 128. The WAN 128 may be any suitable type of WAN, which may utilize various communications technologies. For example, the WAN 128 may be a wired core network, a wireless core network, or the like, as well as various combinations thereof.

The customer bridging domains 122-1-122-X are each communicatively connected to the customer management element 125, which provides an interface to the public data network 140 to support forwarding of traffic between the customer premises 110-1-110-X and the public data network 140 as discussed further below.

The customer bridging domains 122-1-122-X include a plurality of bridge forwarding information bases (BFIBs) 123-1-123-X (collectively, BFIBs 123), respectively. The BFIBs 123-1-123-X are configured to store information which may be used by the respective customer bridging domains 122-1-122-X to support forwarding of customer traffic associated with the respective customer premises 110-1-110-X. For example, the information maintained within a BFIB 123 associated with a customer bridging domain 122 may include address information (e.g., MAC addresses of customer devices of the customer premises 110, MAC addresses of customer components hosted for the customer within the private data network 130, or the like), tunnel information (e.g., tunnel endpoint information for the tunnel 119 between the customer bridge 112 of the customer premises 110 and the customer bridging domain 122, tunnel endpoint information for the tunnel 129 between the customer bridging domain 122 and the private data network 130, or the like), packet forwarding information (e.g., mappings between addresses and indications of forwarding of packets directed to the respective addresses), or the like, as well as various combinations thereof. The customer bridging domains 122-1-122-X each are configured to communicate with controller 121 to support exchanging of information which may be used to support forwarding of customer traffic associated with respective customer premises 110-1-110-X (e.g., providing information learned by the customer bridging domains 122-1-122-X to the controller 121 for advertising to the private data network 130, receiving from the controller 121 information about the private data network 130 that was advertised to the controller 121 from the private data network 130, or the like, as well as various combinations thereof), which is discussed further below.

The customer bridging domains 122-1-122-X include a plurality of bridge traffic forwarding controllers (BTFCs) 124-1-124-X (collectively, BTFCs 124), respectively. The customer bridging domains 122-1-122-X each are configured to communicate with the private data network 130 and the public data network 140 under the control of the respective BTFCs 124-1-124-X of customer bridging domains 122-1-122-X based on information available from the BFIBs 123-1-123-X, respectively. The customer bridging domains 122-1-122-X each are configured to communicate with the private data network 130 and the public data network 140 under the control of the respective BTFCs 124-1-124-X of the customer bridging domains 122-1-122-X, respectively, to support communication of customer traffic between the customer bridging domains 122-1-122-X and the private data network 130 and to support communication of customer traffic between the customer bridging domains 122-1-122-X and the public data network 140. The operation of BFTCs 124-1-124-X of respective customer bridging domains 122-1-122-X in controlling the forwarding of customer traffic based on BFIBs 123-1-123-X is discussed further below.

The customer management element 125 is configured to provide functions typically provided by a broadband network gateway for traffic intended for transport via the Internet or other suitable type of public data network. For example, the customer management element 125 may be configured to provide one or more of authentication functions, authorization functions, accounting functions, quality-of-service (QoS) monitoring functions, QoS application functions, or the like, as well as various combinations thereof. It is noted that the customer management element 125 may be configured to provide various other functions as discussed further below.

The private data network 130 may include any private data network which may host elements which may be configured to operate as extensions of the customer LANs 111 of the customer premises 110. For example, the private data network 130 may be an operator network (e.g., a private network of a network operator, a datacenter of a cloud operator, a network of a cloud operator (e.g., multiple datacenters), or the like), a private enterprise network, or the like. The private data network 130 includes a controller 131, a plurality of switching elements 132-1-132-X (collectively, switching elements 132), and a plurality of customer components 135-1-135-X (collectively, customer components 135). It will be appreciated that, although primarily depicted and described with respect to embodiments in which the switching elements 132 and the customer components 135 are disposed within a single private data network (illustratively, private data network 130), the switching elements 132 and associated customer components 135 may be distributed across multiple private data networks.

The controller 131 is configured to provide various control functions for private data network 130. The controller 131 may be configured to interface with controller 121 of the BNG 120 (e.g., to support exchanging of information which is used to support communications by the customer devices of the customer LANs 111 and by the customer components of the private data network 130 that are associated with the customer LANs 111, as discussed further below).

The switching elements 132-1-132-X are configured to forward, or bridge, traffic of customer components 135-1-135-X, respectively. Namely, the switching elements 132-1-132-X are configured to (1) forward traffic received via the respective tunnels 129-1-129-X toward the respective customer components 135-1-135-X and (2) forward traffic received from the customer components 135-1-135-X toward the respective customer bridging domains 122-1-122-X via respective tunnels 129-1-129-X. The switching elements 132 may be physical switches, virtual switches hosted on physical hardware, or the like. It will be appreciated that the implementation of switching elements 132 may depend on the type of private data network 130 in which the switching elements 132 are deployed (e.g., physical switches or virtual switches in an operator network, physical or virtual switches in a datacenter, or the like).

The customer components 135-1-135-X may be configured to operate as extensions of the customer LANs 111-1-111-X of the customer premises 110-1-110X, respectively. The customer components 135 may be physical components, virtual components, or the like. For example, the customer components 135 may include physical or virtual servers (e.g., media servers, Digital Living Network Alliance (DLNA) servers, or the like), virtual machines (VMs), physical or virtual file systems, physical or virtual databases, or the like. It will be appreciated that, although primarily presented herein with respect to embodiments in which each of the customer LANs 111-1-111-X has only a single customer component 135 associated therewith (illustratively, customer components 135-1-135-X associated with respective customer LANs 111-1-111-X), each of the customer LANs 111-1-111-X may have one or more customer components 135 associated therewith.

As discussed herein, customer bridges 112-1-112-X, tunnels 119-1-119-X, customer bridging domains 122-1-122-X, and tunnels 129-1-129-X associated with the customer premises 110-1-110-X, respectively, enable customer components 135-1-135-X of private data network 130 to appear as devices of the customer LANs 111-1-111-X, respectively. In other words, for a given customer premises 110 of a customer, the customer bridge 112 of the customer premises 110, the tunnel 119 from the customer bridge 112 to the customer bridging domain 122 on the BNG 120 for the customer, the customer bridging domain 122 on the BNG 120 for the customer, the tunnel 129 from the customer bridging domain 122 on the BNG 120 for the customer to the switching element 132 in the private data network 130, and the switching element 132 in the private data network 130 provided an extended customer LAN for the customer that extends from the customer LAN 111 within the customer premises 110 to the customer component 135 that is hosted within the private data network 130 for the customer. In this manner, the customer LAN 111 for the customer, which would otherwise be restricted to the customer premises 110 of the customer, is extended into the private data network 130 such that the customer component 135 of the private data network 130 for the customer appears as a device of the customer LAN 111 of the customer.

The public data network 140 may be the Internet or any other suitable type of public data network. As indicated above, the public data network 140 is accessible from BNG 120 via the customer management element 125 of the BNG 120.

As discussed above, the BNG 120 and the private data network 130 are configured to cooperate to support exchanging of information which is used to support communications by the customer devices of the customer LANs 111 and by the customer components 135 of the private data network 130 that are associated with the customer LANs 111. The information that is exchanged may include address information (e.g., Layer 2 addresses of customer devices of the customer premises 110 (e.g., MAC addresses of customer devices of the customer premises 110), Layer 2 addresses of customer components 135 hosted within the private data network 130 (e.g., MAC addresses of customer components 135 hosted within the private data network 130), or the like). The information that is exchanged may include tunnel information for tunnels associated with the customer bridging domains 122, such as tunnel identifiers (e.g., tunnel identifiers of the tunnels 129 between the customer bridging domains 122 and the switching elements 132 of the private data network 130), tunnel endpoint information (e.g., tunnel endpoint identifiers or other suitable types of tunnel endpoint information) for the tunnels 129 between the customer bridging domains 122 and the switching elements 132 of the private data network 130), or the like, as well as various combinations thereof. The information that is exchanged may include packet forwarding information (e.g., mappings between addresses of customer devices of the customer LANs 111 and the respective customer bridging domains 122 with which the customer devices of the customer LANs 111 are associated, mappings between addresses of customer components 135 hosted within the private data network 130 and the respective customer bridging domains 122 with which the customer components 135 are associated, or the like). The information may be exchanged via various protocols, message types, or the like, as well as various combinations thereof. A discussion of embodiments related to exchanging of information follows, and an associated method is depicted and described with respect to FIG. 2.

The controller 121 is configured to advertise MAC addresses learned by the customer bridging domains 122-1-122-X to the private data network 130. The customer bridging domains 122-1-122-X are configured to learn the MAC addresses of customer devices of customer LANs 111-1-111-X, respectively, and to provide the learned MAC addresses to the controller 121 such that the controller 121 may advertise the learned MAC addresses to the private data network 130. For example, upon receiving a packet via a tunnel 119, the BTFC 124 of the customer bridging domain 122 that receives the packet may perform a lookup based on a source MAC address of the packet to determine whether an entry for the source MAC address exists in the associated BFIB 123 of the customer bridging domain 122 that receives the packet and, based on a determination than an entry does not exist, may perform MAC address learning functions to learn the MAC address, associate the learned MAC address with the customer bridging domain 122, and provide the learned MAC address information to the controller 121 for advertisement to the private data network 130 (e.g., a mapping of the MAC address of the customer device to the customer bridging domain 122). The controller 121 also may be configured to advertise to private data network 130 other types of information, such as other information learned by or otherwise available from the customer bridging domains 122 (e.g., tunnel identifiers of the tunnels 129-1-129-X associated with the respective customer bridging domains 122-1-122-X, tunnel endpoint identifiers of the tunnels 129-1-129-X at the respective customer bridging domains 122-1-122-X, or other types of information which may be used by private data network 130 to communicate with BNG 120), information available from BNG 120 (e.g., the default gateway (GW) MAC address of the BNG 120, which may be the same or different for different ones of the customer bridging domains 122), or the like, as well as various combinations thereof.

The controller 131 is configured to receive MAC addresses of the customer premises 110 (advertised by the controller 121 of BNG 120 as discussed above) and to update the private data network 130 to store the MAC addresses for use by the customer components 135-1-135-X in sending packets toward customer devices of the customer LANs 111-1-111-X, respectively. The controller 131, upon receiving an MAC address advertisement from controller 121 that includes a MAC address of a customer device of a particular customer premises 110, identifies the switching element 132 with which the MAC address (and, thus, customer bridging domain 122) is associated and updates a bridge forwarding information base of the switching element 132 to include an entry mapping the MAC address to a next hop to the MAC address (e.g., an identification of the associated tunnel 129, an identification of the customer bridging domain 122, or the like, as well as various combinations thereof), such that the switching element 132 is able to control forwarding of packets intended for delivery from the customer component 135 to the customer device of the customer premises 110). The controller 131 also may be configured to receive from the BNG 120 other types of information advertised by the controller 121 (e.g., endpoint identifiers of the tunnels 129-1-129-X at the respective customer bridging domains 122-1-122-X or other types of information which may be advertised by the controller 121 to the private data network 130).

The controller 131 is configured to advertise MAC addresses of customer components 135 of private data network 130 to the BNG 120. The controller 131 may advertise MAC addresses of customer components 135 upon receiving MAC address information for the customer components 135. The controller 131 may receive the MAC address information for customer components 135 in various ways. The controller 131 may receive the MAC address of a customer component 135 when the customer component 135 is provisioned for an associated customer premises 110 (e.g., when a VM is instantiated). The controller 131 may receive the MAC address of a customer component 135 from the associated switching element 132 supporting the customer component 135 when the switching element 132 learns the MAC address (e.g., when the customer component 135 sends a packet to the switching element 132 and the switching element 132 does not have an entry for the MAC address of the customer component 135). The controller 131 may advertise MAC addresses of customer components 135 to BNG 120 by advertising mappings of the MAC addresses of the customer components 135 to the respective customer bridging domains 122 with which the customer components 135 are associated. The controller 131 also may be configured to advertise to BNG 120 other types of information learned by or otherwise available from the private data network 130 (e.g., endpoint identifiers of the tunnels 129-1-129-X at the respective switching elements 132-1-132-X or other types of information which may be used by the customer bridging domains 122-1-122-X of BNG 120 to communicate with the private data network 130).

The controller 121 is configured to receive MAC addresses of the private data network 130 (advertised by the controller 131 of private data network 130 as discussed above) and to update the BNG 120 to store the MAC addresses for use by the customer bridging domains 122-1-122-X in controlling forwarding of packets received from customer devices of the customer LANs 111-1-111-X, respectively. The controller 121, upon receiving an MAC address advertisement from controller 131 that includes a MAC address of a customer component 135 associated with a particular customer premises 110, identifies the customer premises 110 with which the MAC address (and, thus, customer component 135) is associated and updates the BFIB 123 of the customer bridging domain 122 supporting the identified customer premises 110 to include an entry mapping the MAC address to a path to the MAC address (e.g., an identification of the associated tunnel 129, an identification of the associated switching element 132, or the like, as well as various combinations thereof), such that the BTFC 124 of the customer bridging domain 122 is able to control forwarding of packets intended for delivery to the customer component 135). The controller 121 also may be configured to receive from private data network 130 other types of information advertised by the controller 131 (e.g., tunnel identifiers of the tunnels 129-1-129-X associated with the respective customer bridging domains 122-1-122-X, tunnel endpoint identifiers of the tunnels 129-1-129-X at the respective switching elements 132-1-132-X or other types of information which may be advertised by the controller 131 to the BNG 120).

The controller 121 of BNG 120 and the controller 131 of private data network 130, as discussed above, exchange information which may be used to support communications by the customer devices of the customer LANs 111 and by the customer components 135 associated with the customer LANs 111 (e.g., address information such as MAC address information, tunnel endpoint identifiers, or the like, as well as various combinations thereof). The controller 121 and the controller 131 may exchange such information using any suitable protocol. For example, controller 121 and controller 131 may exchange the information using a mechanism for advertising the information in the control plane, such as Border Gateway Protocol (BGP) Multi-Protocol Label Switching (MPSL) Ethernet VPN (EVPN). In EVPN, generally speaking, the provider edge (PE) elements advertise MAC addresses learned from the customer edge (CE) elements connected thereto in the control plane using Multi-protocol BGP (MP-BGP), and the MAC address learning between the PEs and the CEs connected thereto may be provided using any suitable MAC address learning mechanism (e.g., data-plane learning, management plane learning, Link Layer learning (e.g., the Link Layer Discovery Protocol (LLDP), the Address Resolution Protocol (ARP), or the like). The controller 121 and the controller 131 may have BGP/EVPN instances provisioned thereon. The controller 121 and the controller 131 may establish a BGP/EVPN peering relationship and exchange information using BGP/EVPN messages. For example, the controller 121 and the controller 131 may use the BGP/EVPN relationship to exchange MAC address information, thereby enabling the controller 121 to learn MAC addresses at BNG 120 using any suitable MAC address learning mechanisms and, similarly, enabling the controller 131 to learn MAC addresses at private data network 130 using any suitable MAC address learning mechanisms. For example, the controller 121 and the controller 131 may use the BGP/EVPN relationship to exchange tunnel endpoint identifier information. It is noted that use of BGP/EVPN may obviate the need to manually configure certain types of information on the controller 121 or the controller 131 (e.g., MAC addresses, tunnel endpoint identifiers of the tunnels 129, or the like). It is noted that one or more BGP/EVPN instances may be auto-provisioned on the BNG 120.

As discussed above, the customer bridges 112, BNG 120, and private data network 130 are configured to support Layer 2 based traffic forwarding (e.g., MAC-based traffic forwarding). A discussion of embodiments related to Layer 2 based traffic forwarding (primarily discussed within the context of MAC-based traffic forwarding) follows, and an associated method is depicted and described with respect to FIG. 3.

The customer bridges 112 of the customer premises 110 may be configured to perform packet forwarding based on MAC addresses of packets received by the customer bridges 112. The customer bridge 112 of a customer premises 110, upon receiving a packet may determine a destination MAC address of the packet and forward the packet based on the destination MAC address of the packet. For an upstream packet received from a customer device of the customer premises 110, for example, the customer bridge 112 may forward the packet to a second customer device of the customer premises 110 based on a determination that the destination MAC address identifies the second customer device of the customer premises 110 or may forward the packet toward the customer bridging domain 112 via the tunnel 119 based on a determination that the destination MAC address is a default GW MAC address of the BNG 120 or is a MAC address of the customer component 135 (e.g., these may be a combined or separate entries within the forwarding table of the customer bridge 112). For a downstream packet received via the tunnel 119 to the customer bridge 112 of the customer premises 110, for example, the customer bridge 112 may forward the packet toward the customer device(s) of the customer premises 110 for which the packet is intended.

The customer bridging domains 122 of BNG 120 may be configured to perform packet forwarding based on MAC addresses of packets received by the customer bridging domains 122. The packets may be upstream packets from customer devices of the customer premises 110 that are intended for delivery to the private data network 130 or public data network 140. The packets may be downstream packets received from the private data network 130 or the public data network 140 and intended for delivery to customer devices of customer premises 110.

The customer bridging domains 122 of BNG 120 may be configured to perform packet forwarding for upstream traffic based on MAC addresses of upstream packets received by the customer bridging domains 122 from customer devices of the customer LANs 111 of the customer premises 110, respectively. It is noted that, for purposes of clarity in describing MAC-based packet forwarding, it is assumed that the relevant MAC addresses have already been learned. It is further noted that, for purposes of clarity, MAC-based packet forwarding is described from the perspective of a given customer LAN 111 of a given customer premises 110. A customer device of the customer LAN 111 generates a packet that is intended for delivery either to the private data network 130 (e.g., to the associated customer component 135 for the customer premises 110) or to the public data network 140. If the packet is intended for the private data network 130, the customer device sets the MAC destination address of the packet to the MAC address of the customer component 135 for which the packet is intended. If the packet is intended for the public data network 140, the customer device sets the MAC destination address of the packet to the default GW MAC address of the BNG 120. The customer device then sends the packet to the customer bridge 112 via the customer LAN 111 and the customer bridge 112 sends the packet to the customer bridging domain 122 via the associated tunnel 119. The customer bridging domain 122 receives the packet from the customer bridge 112 via the associated tunnel 119. The customer bridging domain 122 determines, based on the destination MAC address of the packet, whether to forward the packet toward the private data network 130 or the public data network 140. For example, the BTFC 124 of the customer bridging domain 122 may perform a lookup in the BFIB 123 of the customer bridging domain 122 using the destination MAC address of the packet. If the destination MAC address is a MAC address of the customer component 135, the entry in the BFIB 123 will include information indicative that the packet is to be forwarded toward the private data network 130 via the associated tunnel 129 for the customer bridging domain 122 and, thus, the BTFC 124 will control forwarding of the packet via the tunnel 129 for delivery to the customer component 135 of the private data network 130. If the destination MAC address is the default GW MAC address of the BNG 120, the entry in the BFIB will include information indicative that the packet is to be forwarded toward the public data network 140 and, thus, the BTFC 124 will control forwarding of the packet toward the customer management element 125 for delivery to the public data network 140.

The customer bridging domains 122 of BNG 120 may be configured to perform packet forwarding for downstream traffic originating from the private data network 130 based on MAC addresses of downstream packets received by the customer bridging domains 122 from customer components 135 associated with the customer premises 110, respectively. It is noted that, for purposes of clarity in describing MAC-based packet forwarding, it is assumed that the relevant MAC addresses have already been learned. It is further noted that, for purposes of clarity, MAC-based packet forwarding is described from the perspective of a given customer LAN 111 of a given customer premises 110. A customer component 135 associated with the customer premises 110 generates a packet that is intended for delivery either to the customer premises 110 (e.g., to one of the customer devices of the customer premises 110) or to the public data network 140. If the packet is intended for one of the customer devices of the customer premises 110, the customer component 135 sets the destination MAC address to the MAC address of the one of the customer devices of the customer premises 110. If the packet is intended for the public data network 140, customer component 135 sets the destination MAC address of the packet to the default GW MAC address of the BNG 120. The customer component 135 then sends the packet to the switching element 132 and the switching element 132 sends the packet to the customer bridging domain 122 via the associated tunnel 129. The customer bridging domain 122 receives the packet from the switching element 132 via the associated tunnel 129. The customer bridging domain 122 determines, based on the destination MAC address of the packet, whether to forward the packet toward the customer premises 110 or the public data network 140. For example, the BTFC 124 of the customer bridging domain 122 may perform a lookup in the BFIB 123 of the customer bridging domain 122 using the destination MAC address of the packet. If the destination MAC address is a MAC address of the one of the customer devices of the customer premises 110, the entry in the BFIB 123 will include information indicative that the packet is to be forwarded toward the customer premises 110 via the associated tunnel 119 for the customer premises 110 and, thus, the BTFC 124 will control forwarding of the packet via the tunnel 119 for delivery to the one of the customer devices of the customer premises 110. If the destination MAC address is the default GW MAC address of the BNG 120, the entry in the BFIB 123 will include information indicative that the packet is to be forwarded toward the public data network 140 and, thus, the BTFC 124 will control forwarding of the packet toward the customer management element 125 for delivery to the public data network 140.

The customer bridging domains 122 of BNG 120 may be configured to perform packet forwarding for downstream traffic originating from the public data network 140 based on MAC addresses of downstream packets received by the customer bridging domains 122 from devices accessible via the public data network 140, respectively. It is noted that, for purposes of clarity in describing MAC-based packet forwarding, it is assumed that the relevant MAC addresses have already been learned. It is further noted that, for purposes of clarity, MAC-based packet forwarding is described from the perspective of a given customer LAN 111 of a given customer premises 110. A device available via public data network 140 generates a packet that is intended for delivery either to the customer premises 110 (e.g., to one of the customer devices of the customer LAN 111 of the customer premises 110) or to the private data network 130 (e.g., to one of the customer components 135 associated with the customer premises 110). If the packet is intended for one of the customer devices of the customer premises 110, the source device sets the destination MAC address to the MAC address of the one of the customer devices of the customer premises 110. If the packet is intended for the customer component 135 associated with the customer premises 110, the source device sets the destination MAC address of the packet to the MAC address of the customer component 135. The customer management element 125 receives the packet from the source device via the public data network 140 and forwards the packet to the customer bridging device 122 associated with the customer. The customer bridging domain 122 receives the packet from the customer management element 135. The customer bridging domain 122 determines, based on the destination MAC address of the packet, whether to forward the packet toward the customer premises 110 or the private data network 130. For example, the BTFC 124 of the customer bridging domain 122 may perform a lookup in the BFIB 123 of the customer bridging domain 122 using the destination MAC address of the packet. If the destination MAC address is a MAC address of the one of the customer devices of the customer premises 110, the entry in the BFIB 123 will include information indicative that the packet is to be forwarded toward the customer premises 110 via the associated tunnel 119 for the customer premises 110 and, thus, the BTFC 124 will control forwarding of the packet via the tunnel 119 for delivery to the one of the customer devices of the customer premises 110. If the destination MAC address is a MAC address of the customer component 135 associated with the customer premises, the entry in the BFIB 123 will include information indicative that the packet is to be forwarded toward the private data network 130 via the associated tunnel 129 and, thus, the BTFC 124 will control forwarding of the packet via the tunnel 129 for delivery to the customer component 135 of the private data network 130.

As discussed herein, the customer bridges 112-1-112X, tunnels 119-1-119-X, customer bridging domains 122-1-122-X, tunnels 129-1-129-X, and switching elements 132-1-132-X enable the bridging domains of the customer premises 110-1-110X to be extended from the customer premises 110-1-110-X into the private data network 130 all the way to the customer components 135-1-135-X hosted for the respective customers within the private data network 130. This enables the customer components 135-1-135-X hosted within the private data network 130 for the respective customers to appear, from the end user point of view of the customers, as being part of the customer LANs 111-1-111-X, thereby making the customer components 135-1-135-X discoverable by the customer devices of the respective customer LANs 111-1-111-X (e.g., using Simple Service Discovery Protocol (SSDP), Service Location Protocol (SLP), or the like), enabling the customer devices of the customer LANs 111-1-111-X and the customer components 135-1-135-X to communicate as part respective common bridging domains (e.g., Ethernet bridging domains or other suitable types of Layer 2 bridging domains), or the like, as well as various combinations thereof. It is noted that the establishment of an Ethernet bridge domain between a customer LAN 111 and the private data network 130 enables various types of protocols (e.g., not only IP, but also non-IP protocols) to be used for communications between the customer devices of the customer LAN 111 and the corresponding customer component 135 hosted within the private data network 130 for the customer. It is noted that the establishment of respective Ethernet bridge domains between the customer LANs 111 and the private data network 130 provides the operator of the private data network 130 with visibility to all of the customer devices on the respective customer LANs 111, which may enable the operator to providing operational support for customer devices, customer support for customer devices, or the like.

Figure 2:
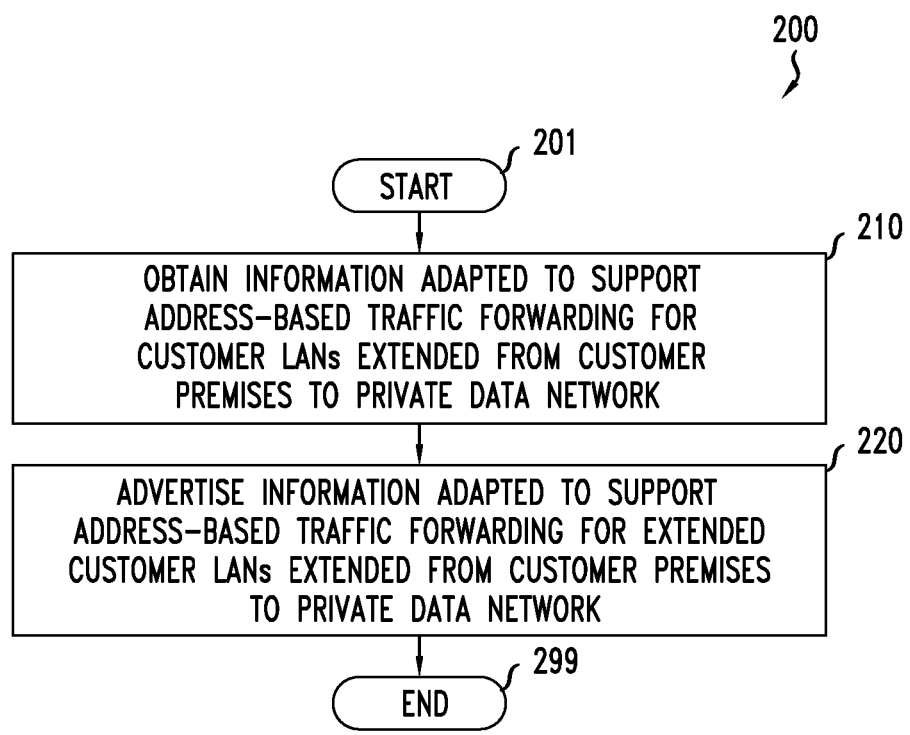
FIG. 2 depicts a flow diagram of a method for exchanging information, for use in supporting address-based traffic forwarding, according to various embodiments.

FIG. 2 depicts a flow diagram of a method for exchanging information, for use in supporting address-based traffic forwarding, according to various embodiments. It is noted that method 200 may be executed by a controller of a broadband network gateway (e.g., controller 121 or BNG 120 of FIG. 1) or by a controller of a private data network (e.g., controller 131 of private data network 130). It will be appreciated that, although primarily presented herein as being performed serially, a portion of the functions of method 200 may be performed contemporaneously or in a different order than as presented in FIG. 2. At block 201, method 200 begins. At block 210, information adapted to support address-based traffic forwarding, for extended customer LANs extended from customer premises to a private data network, is obtained. At block 220, the information adapted to support address-based traffic forwarding, for extended customer LANs extended from customer premises to a private data network, is advertised. For example, the information may be obtained by the broadband network gateway and advertised by the broadband network gateway to the private data network. For example, the information may be obtained by the private data network and advertised to the broadband network gateway. The information adapted to support address-based traffic forwarding may include Layer 2 address information (e.g., MAC addresses or other suitable types of Layer 2 addresses), tunnel information (e.g., tunnel IDs, tunnel endpoint IDs, or the like), or the like, as well as various combinations thereof. At block 299, method 200 ends.

Figure 3:
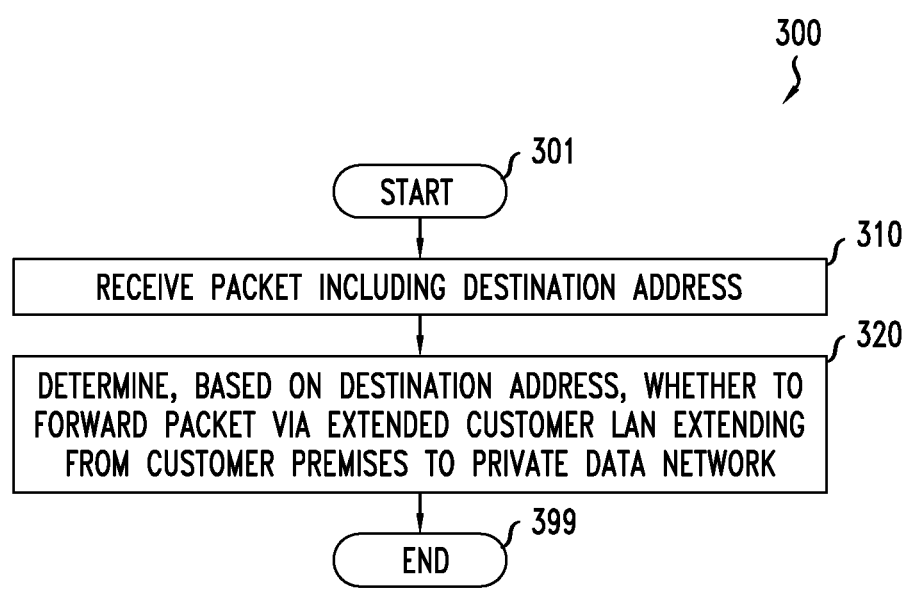
FIG. 3 depicts a flow diagram of a method for address-based traffic forwarding according to various embodiments.

FIG. 3 depicts a flow diagram of a method for address-based traffic forwarding according to various embodiments. It is noted that method 300 may be executed by a customer bridge of a customer premises (e.g., a customer bridge 112 of a customer premises 110), a customer bridging domain of a broadband network gateway (e.g., a customer bridging domain 122 of BNG 120), a switching element of a private data network (e.g., a switching element 132 of a private data network 130), or other devices involved in forwarding of customer traffic as discussed herein. It will be appreciated that, although primarily presented herein as being performed serially, a portion of the functions of method 300 may be performed contemporaneously or in a different order than as presented in FIG. 3. At block 301, method 300 begins. At block 310, a packet is received. The packet includes a destination address. The destination address may be a Layer 2 destination address. For example, the destination address may be a destination MAC address. At block 320, a determination is made, based on the destination address, whether to forward the packet via an extended customer LAN extending from a customer premises to a private data network. For example, for a customer bridge at a customer premises, the customer bridge may receive the packet from a customer device of the customer premises and determine whether to forward the packet internally within the customer premises or whether to forward the packet via a tunnel from the customer bridge to a customer bridging domain for the customer on a broadband network gateway (where the tunnel forms part of the extended customer LAN of the customer). For example, for a customer bridging domain at a broadband network gateway, the customer bridging domain may receive the packet via a first tunnel of the extended customer LAN of the customer and determine whether to forward the packet via a second tunnel of the extended customer LAN of the customer or whether to forward the packet toward a public data network (e.g., the first tunnel may be a tunnel from the customer bridge to the customer bridging domain and the second tunnel may be a tunnel from the customer bridging domain to a switching element of the private data network or the first tunnel may be a tunnel from a switching element of the private data network to the customer bridging domain and the second tunnel may be a tunnel from the customer bridging domain to the customer bridge). At block 399, method 300 ends.

Figure 4:
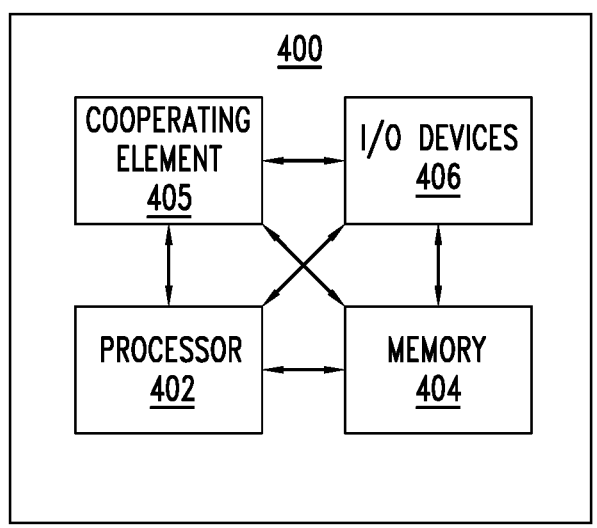
FIG. 4 depicts a high-level block diagram of a computer suitable for use in performing various functions described herein.

FIG. 4 depicts a high-level block diagram of a computer suitable for use in performing various functions described herein The computer 400 includes a processor 402 (e.g., a central processing unit (CPU), a processor having a set of processor cores, a processor core of a processor, or the like) and a memory 404 (e.g., a random access memory (RAM), a read only memory (ROM), or the like). The processor 402 and the memory 404 are communicatively connected.

The computer 400 also may include a cooperating element 405. The cooperating element 405 may be a hardware device. The cooperating element 405 may be a process that can be loaded into the memory 404 and executed by the processor 402 to implement functions as discussed herein (in which case, for example, the cooperating element 405 (including associated data structures) can be stored on a computer-readable storage medium, such as a storage device or other storage element (e.g., a magnetic drive, an optical drive, or the like)).

The computer 400 also may include one or more input/output devices 406. The input/output devices 406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 400 of FIG. 4 may represent a general architecture and functionality suitable for implementing functional elements described herein, portions of functional elements described herein, or the like, as well as various combinations thereof. For example, computer 400 may provide a general architecture and functionality that is suitable for implementing one or more of a customer device of a customer premises 110, a customer bridge 112 of a customer premises 110, BNG 120, controller 121, a customer bridging domain 122, customer management element 125, an element or set of elements of private data network 130, a switching element 132, a customer component 135, an element or set of elements of public data network 140, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that at least some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory including a set of instructions;
    wherein the set of instructions is configured to, when executed by the at least one processor, cause the apparatus to:
        support, by a controller of a network device hosting a customer bridging domain and based on communication with a controller of a private data network hosting a customer component, exchange of forwarding information configured to support bridging of customer traffic between a customer device at a customer premises and the customer component, wherein the forwarding information includes a mapping of an address of the customer component to the customer bridging domain;
        receive, at the customer bridging domain via a first tunnel between the customer bridging domain and a customer bridge of the customer premises, a customer packet of the customer device, wherein the customer packet includes a layer 2 destination address of the customer component;
        determine, at the customer bridging domain based on the forwarding information and the layer 2 destination address of the customer component, a second tunnel between the customer bridging domain and a switching element of the private data network associated with the customer component; and
        send, by the customer bridging domain toward the switching element via the second tunnel, the customer packet.

2. The apparatus of claim 1, wherein the customer bridging domain comprises a layer 2 virtual bridge or a layer 2 virtual service.

3. The apparatus of claim 1, wherein the layer 2 destination address of the customer component comprises a Media Access Control (MAC) address.

4. The apparatus of claim 1, wherein the customer component comprises a physical server, a virtual server, or a virtual machine (VM).

5. The apparatus of claim 1, wherein the first tunnel comprises a virtual local area network (VLAN) tunnel or an Internet Protocol (IP) tunnel.

6. The apparatus of claim 1, wherein the second tunnel comprises a virtual extensible local area network (VXLAN) tunnel or a Multi-Protocol Label Switching (MPLS) tunnel.

7. The apparatus of claim 1, wherein, to support the exchange of the forwarding information, the set of instructions is configured to, when executed by the at least one processor, cause the apparatus to:
  receive, by the controller of the network device from the controller of the private data network, the mapping of the address of the customer component to the customer bridging domain.

8. The apparatus of claim 1, wherein, to support the exchange of the forwarding information, the set of instructions is configured to, when executed by the at least one processor, cause the apparatus to:
  receive, by the controller of the network device from the controller of the private data network, at least one of a mapping of a tunnel identifier of the second tunnel to the switching element or a mapping of a tunnel endpoint identifier of an endpoint of the second tunnel on the switching element to the switching element.

9. The apparatus of claim 1, wherein, to support the exchange of the forwarding information, the set of instructions is configured to, when executed by the at least one processor, cause the apparatus to:
  send, by the controller of the network device toward the controller of the private data network, at least one of a mapping of an address of the customer device to the customer bridging domain, a mapping of a tunnel identifier of the second tunnel to the customer bridging domain, or a mapping of a tunnel endpoint identifier of an endpoint of the second tunnel on the customer bridging domain to the customer bridging domain.

10. The apparatus of claim 1, wherein, to support the exchange of the forwarding information, the set of instructions is configured to, when executed by the at least one processor, cause the apparatus to:
  support the exchange of the forwarding information based on a Border Gateway Protocol (BGP).

11. The apparatus of claim 10, wherein, to support the exchange of the forwarding information, the set of instructions is configured to, when executed by the at least one processor, cause the apparatus to:
  support the exchange of the forwarding information based on an Ethernet Virtual Private Network (EVPN).

12. An apparatus, comprising:
  at least one processor; and
  at least one memory including a set of instructions;
  wherein the set of instructions is configured to, when executed by the at least one processor, cause the apparatus to:
    support, by a controller of a network device hosting a customer bridging domain and based on communication with a controller of a private data network hosting a customer component, exchange of forwarding information configured to support bridging of customer traffic between the customer component and a customer device at a customer premises, wherein the forwarding information includes a mapping of an address of the customer device to the customer bridging domain;
    receive, at the customer bridging domain via a first tunnel between the customer bridging domain and a switching element of the private data network associated with the customer component, a customer packet of the customer component, wherein the customer packet includes a layer 2 destination address of the customer device;
    determine, at the customer bridging domain based on the forwarding information and the layer 2 destination address of the customer device, a second tunnel between the customer bridging domain and a customer bridge of the customer premises; and
    send, by the customer bridging domain toward the customer bridge via the second tunnel, the customer packet.

13. The apparatus of claim 12, wherein the customer bridging domain comprises a layer 2 virtual bridge or a layer 2 virtual service.

14. The apparatus of claim 12, wherein the layer 2 address comprises a Media Access Control (MAC) address.

15. The apparatus of claim 12, wherein the customer device comprises a computer, a printer, a smartphone, a television, a server, a switch, or a router.

16. The apparatus of claim 12, wherein the first tunnel comprises a virtual extensible local area network (VXLAN) tunnel or a Multi-Protocol Label Switching (MPLS) tunnel.

17. The apparatus of claim 12, wherein the second tunnel comprises a virtual local area network (VLAN) tunnel or an Internet Protocol (IP) tunnel.

18. The apparatus of claim 12, wherein, to support the exchange of the forwarding information, the set of instructions is configured to, when executed by the at least one processor, cause the apparatus to:
  send, by the controller of the network device toward the controller of the private data network, the mapping of the address of the customer device to the customer bridging domain.

19. The apparatus of claim 12, wherein, to support the exchange of the forwarding information, the set of instructions is configured to, when executed by the at least one processor, cause the apparatus to:
  send, by the controller of the network device toward the controller of the private data network, at least one of a mapping of a tunnel identifier of the first tunnel to the customer bridging domain or a mapping of a tunnel endpoint identifier of an endpoint of the first tunnel on the customer bridging domain to the customer bridging domain.

20. The apparatus of claim 12, wherein, to support the exchange of the forwarding information, the set of instructions is configured to, when executed by the at least one processor, cause the apparatus to:
  receive, by the controller of the network device from the controller of the private data network, at least one of a mapping of an address of the customer component to the customer bridging domain, a mapping of a tunnel identifier of the first tunnel to the switching element, or a mapping of a tunnel endpoint identifier of an endpoint of the first tunnel on the switching element to the switching element.

21. The apparatus of claim 12, wherein, to support the exchange of the forwarding information, the set of instructions is configured to, when executed by the at least one processor, cause the apparatus to:
  support the exchange of the forwarding information based on a Border Gateway Protocol (BGP).

22. The apparatus of claim 21, wherein, to support the exchange of the forwarding information, the set of instructions is configured to, when executed by the at least one processor, cause the apparatus to:
  support the exchange of the forwarding information based on an Ethernet Virtual Private Network (EVPN).

* * * * *